US008745162B2

(12) United States Patent
Weber et al.

(10) Patent No.: US 8,745,162 B2
(45) Date of Patent: Jun. 3, 2014

(54) METHOD AND SYSTEM FOR PRESENTING INFORMATION WITH MULTIPLE VIEWS

(75) Inventors: Karon A. Weber, San Francisco, CA (US); Andrew S. Tomkins, San Jose, CA (US); Reiner Kraft, Gilroy, CA (US); Samantha M. Tripodi, San Francisco, CA (US); Chetana Deorah, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 732 days.

(21) Appl. No.: 11/656,052

(22) Filed: Jan. 19, 2007

(65) Prior Publication Data

US 2008/0052372 A1 Feb. 28, 2008

Related U.S. Application Data

(63) Continuation-in-part of application No. 11/508,596, filed on Aug. 22, 2006.

(51) Int. Cl.
*G06F 15/16* (2006.01)

(52) U.S. Cl.
USPC ............ 709/219; 709/217; 709/203; 709/246

(58) Field of Classification Search
USPC ........................................................ 709/219
See application file for complete search history.

(56) References Cited

U.S. PATENT DOCUMENTS

| 6,289,382 | B1 | 9/2001 | Bowman-Amuah | |
| 6,292,894 | B1* | 9/2001 | Chipman et al. | 713/168 |
| 2002/0049788 | A1 | 4/2002 | Lipkin et al. | |
| 2002/0099734 | A1 | 7/2002 | Yassin et al. | |
| 2002/0099738 | A1 | 7/2002 | Grant | |
| 2002/0194267 | A1 | 12/2002 | Flesner et al. | |
| 2003/0041159 | A1 | 2/2003 | Tinsley et al. | |
| 2003/0167315 | A1* | 9/2003 | Chowdhry et al. | 709/218 |
| 2003/0212654 | A1 | 11/2003 | Harper et al. | |
| 2005/0086688 | A1 | 4/2005 | Omoigui | |
| 2006/0047714 | A1 | 3/2006 | Anderson et al. | |
| 2006/0173985 | A1 | 8/2006 | Moore | |
| 2007/0024594 | A1* | 2/2007 | Sakata et al. | 345/173 |

FOREIGN PATENT DOCUMENTS

| KR | 10-2001-0086860 | 9/2001 |
| KR | 10-2002-0073515 | 9/2002 |

OTHER PUBLICATIONS

International Preliminary Report on Patentability mailed on Mar. 3, 2009, for PCT Application No. PCT/US07/018446, filed on Aug. 20, 2007, six pages.
International Search Report and Written Opinion mailed on Apr. 15, 2008, for PCT Application No. PCT/US2008/000539 filed on Jan. 14, 2008, eleven pages.

(Continued)

*Primary Examiner* — Maceeh Anwari
(74) *Attorney, Agent, or Firm* — James J. DeCarlo; Greenberg Traurig, LLP

(57) ABSTRACT

Method and system for presenting information on a user device are disclosed. The method includes collecting a plurality of data objects on the Internet, annotating each data object in the plurality of data objects in accordance with user-defined data and implicit data, wherein the user-defined data and implicit data form metadata associated with the plurality of data objects, creating correlations between the plurality of data objects using the metadata associated with the plurality of data objects, and presenting the plurality of data objects in multiple views on the user device simultaneously according to the correlations between the plurality of data objects.

19 Claims, 15 Drawing Sheets

(56) References Cited

OTHER PUBLICATIONS

Wikipedia. (Date Unknown). "Ajax (programming)," located at <http://en.wikipedia.org/wiki/AJAX>, last visited on Mar. 14, 2007. (7 pages).
Wikipedia. (Date Unknown). "XML," located at <http://en.wikipedia.org/wiki/Extensible_Markup_Language>, last visited on Mar. 14, 2007. (20 pages).
U.S. Appl. No. 11/508,596, filed Aug. 22, 2006, for Weber et al.
Yahoo! (2005). "Yahoo! Desktop Search," located at <http://desktop.yahoo.com/>, last visited on Apr. 26, 2007. (1 page).
Yahoo! (Apr. 15, 2007). "Yahoo! Developer Network Home—Welcome!" located at <http://developer.yahoo.com>, last visited on Apr. 26, 2007. (14 pages).
Yahoo! (Date Unknown). "Yahoo! Widget Engine How to Build a Widget," located at <http://widgets.yahoo.com/workshop/>, last visited on Apr. 26, 2007. (24 pages).
International Search Report mailed on Jul. 18, 2008, for PCT Application No. PCT/US07/18446, filed on Aug. 20, 2007, two pages.
Written Opinion mailed on Jul. 18, 2008, for PCT Application No. PCT/US07/18446, filed Aug. 20, 2007, six pages.
International Preliminary Report on Patentability mailed on Jul. 30, 2009, for PCT Application No. PCT/US2008/000539, filed on Jan. 14, 2008, seven pages.
Notice of Preliminary Rejection issued on Jul. 27, 2011 for Korean Patent Appln. No. 10-2011-7009970.
Notification of Reason(s) for Rejection issued on Oct. 3, 2011 in Japanese Patent Appln. No. 2009-525603.
Office Action from the Korean Patent Office dated Dec. 31, 2010 for Korean Patent Application No. 10-2009-7005792.
Non-final Office Action for U.S. Appl. No. 11/508,596, mailed Jun. 15, 2011.
Final Office Action for U.S. Appl. No. 11/508,596, mailed Sep. 15, 2009.
Non-final Office Action for U.S. Appl. No. 11/508,596, mailed Jul. 13, 2009.
Final Office Action for U.S. Appl. No. 11/508,596, mailed Apr. 1, 2009.
Non-final Office Action for U.S. Appl. No. 11/508,596, mailed Sep. 15, 2008.

* cited by examiner

METHOD AND SYSTEM FOR PRESENTING INFORMATION WITH MULTIPLE VIEWS

CROSS-REFERENCE TO RELATED APPLICATIONS

This application is a continuation-in-part application and claims the benefit of co-pending U.S. application Ser. No. 11/508,596, "Persistent Saving Portal," filed Aug. 22, 2006, which is incorporated herein in its entirety by reference.

FIELD OF THE INVENTION

The present invention relates to the field of Internet applications. In particular, the present invention relates to a method and system for presenting information with multiple views.

BACKGROUND OF THE INVENTION

Currently, if a user wants to save certain information from the web, the user would have to go to the website, click through the web pages, and then bookmark the page in order to save information on the page. Essentially, the user has saved the access to the website. However, there are at least two problems associated with this approach because the Internet is a very transitory evolving environment. First, when the user needs the information again, the website may no longer be there. Second, even if the website is still there, the content of the website has changed such that the information of interest to the user may no longer be there.

Another approach to save certain information from the web is to open a clipboard-like application, such as Microsoft Word, and then the user may select, copy, and paste particular information of interest to the Word document. One drawback of this approach is that other information related to the information of interest is not moved to the Word document when such information is copied. The user would have to manually enter the citation, URL, author, and other contextual information related to the information retrieved, which is a time consuming and tedious task.

Yet another approach is to use an application like My Web offered by Yahoo! Inc., which allows the user to save a copy of the web page containing the information of interest. However, this approach saves both information the user is interested in and the information the user is not interested in. The user may be only interested in a particular section of a page or a particular image on a page. Another drawback of this approach is that once the user saves the page, the user may have lost the citation, URL, author, and other contextual information related to the information retrieved, unless the user enters such information manually.

In the above cases, one drawback is that the user is required to add metadata about the information acquired as a post-harvest action. There is no mechanism that allows the user to gather and annotate the information with metadata in real time. In addition, there is no mechanism to save the information in a structured manner. As a result, the user would have to organize and structure the information into useful formats after such information is collected. Therefore, there is a need to address such issues of the current art. Specifically, there is a need for a persistent saving portal for collecting information on the Internet.

Another drawback is that the user is provided with one style of presentation of the information, whether as a map, a list, a grid (chart), or a calendar view of the data content of interest. For example, when a user is comparing prices of an item on the Internet, typically a grid view (chart) is displayed showing the list prices of the item for different stores. However, the locations of the stores and time the user has to spend to drive to the stores may be some of the user's considerations in deciding to which store the user would go to buy the item. In this case, the user would have to go to the Maps application and search for the location of each store and get an estimated time for driving to that store. As another example, when a user is creating an itinerary for a trip, the user would have to go back and forth between the map, which shows the different locations the user wants to visit, and the comparison charts that show the prices of different airlines, hotels, etc. that the user is willing to pay, such switching back and forth between different views of the information allows the user to fully grasp the data content and to coordinate the different events. In both of the above examples, the processes are tedious and time-consuming. Therefore, there is a need for presenting information to users in a more effective and understandable manner.

SUMMARY

In one embodiment, a method for presenting information on a user device includes collecting a plurality of data objects on the Internet, annotating each data object in the plurality of data objects in accordance with user-defined data and implicit data, wherein the user-defined data and implicit data form metadata associated with the plurality of data objects, creating correlations between the plurality of data objects using the metadata associated with the plurality of data objects, and presenting the plurality of data objects in multiple views on the user device simultaneously according to the correlations between the plurality of data objects.

BRIEF DESCRIPTION OF THE DRAWINGS

The aforementioned features and advantages of the invention, as well as additional features and advantages thereof, will be more clearly understandable after reading detailed descriptions of embodiments of the invention in conjunction with the following drawings.

Like numbers are used throughout the figures.

DESCRIPTION OF EMBODIMENTS

Method and System are provided for presenting information with multiple views. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed description that follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1:
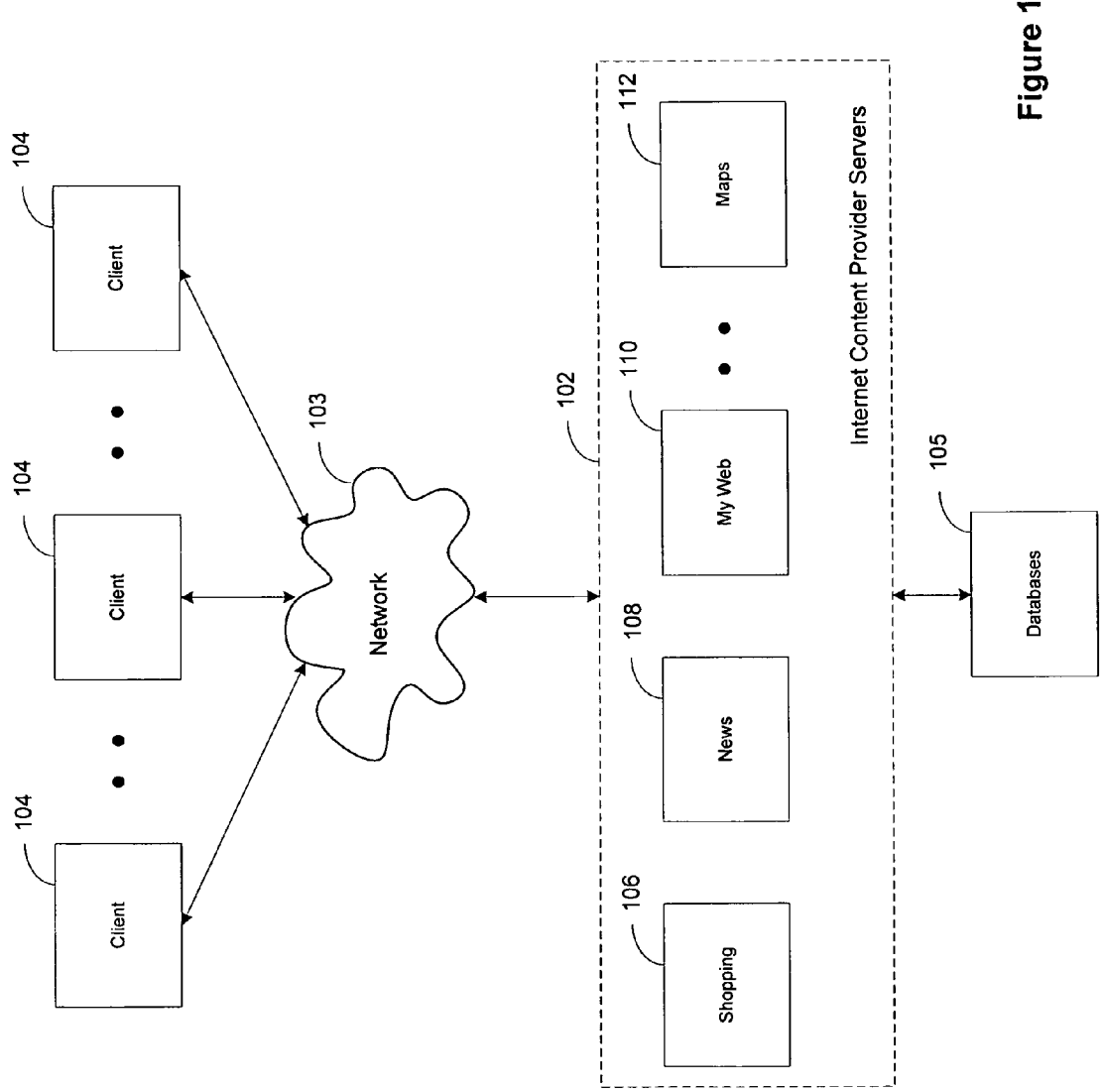
FIG. 1 illustrates a system for presenting information with multiple views on a user device according to an embodiment of the present invention.

FIG. 1 illustrates a system for presenting information with multiple views on a user device according to an embodiment of the present invention. The system includes one or more Internet content provider servers 102, databases 105, and one or more clients 104. The servers 102 interface with the clients 104 via a communication network 103. The Internet content provider servers 102 are host servers operable to provide content to clients 104 via the network 103. One or more of the servers host websites and include the map functions. The databases 105 are operable to store data provided by the servers 102 and/or clients 104. The databases can communicate with the servers 102 or clients 104 via the network 103. The databases can store data items included in the web pages, such as maps and user information.

Alternatively, the servers 102 may include the databases, processors, switches, routers, interfaces, and other components and modules. Each of the servers 102 may comprise one or more servers, or may be combined into a lesser number of servers than shown, depending on computational and/or distributed computing requirements. The servers 102 may be located at different locations relative to each other. The databases may also be separately connected to the servers 102. There may be more or fewer than two databases, depending on computational and/or distributed computing requirements. The databases may be located at different locations relative to each other and the servers 102.

Each of the clients 104 may be a general-purpose computer, such as a personal computer, having a central processing unit (CPU), a memory, an input device, an output device, and a display. Other computer system configurations, including Internet appliances, hand-held devices, wireless devices, portable devices, wearable computers, cellular or mobile phones, portable digital assistants (PDAs), multi-processor systems, microprocessor-based or programmable consumer electronics, set-top boxes, network PCs, mini-computers, and the like may also be implemented as the clients 104. Each of the clients 104 may also implement analog and digital baseband circuitry, power management circuitry, radio frequency (RF) transceiver, and battery interface and charging circuitry. Clients 104 may include one or more applications, program modules, and/or sub-routines. As an example, clients 104 may include a browser application (e.g., Internet Explorer, etc.) and a graphical user interface (GUI) to access websites and web pages provided by the servers 102 and data stored at the databases 105. Clients 104 may be remote from each other, the servers 102, and/or the databases 105.

The network 103 is a communications network, such as a local area network (LAN), a wide area network (WAN), or the Internet. When the network 103 is a public network, security features (e.g., VPN/SSL secure transport) may be included to ensure authorized access within the system.

The servers 102 further include a plurality of individual domains, for example, shopping domain 106, news domain 108, My Web domain 110, Maps domains 112, etc. A domain is a computer system implemented with different hardware and software for a specific application, such as the shopping applications, news applications, and maps applications. The persistent saving portal application and the application for presenting information with multiple views of the present invention are run on the My Web domain 110, which implement Web 2.0 functionalities using a combination of HTML, CSS, JavaScript, Widget Engine, and "Asynchronous JavaScript and XML" (AJAX). In particular, JavaScript is used to create, monitor, change, and destroy objects and change the state of the various objects, in addition to keeping track of browser behavior changes initiated by the user.

Figure 2A:
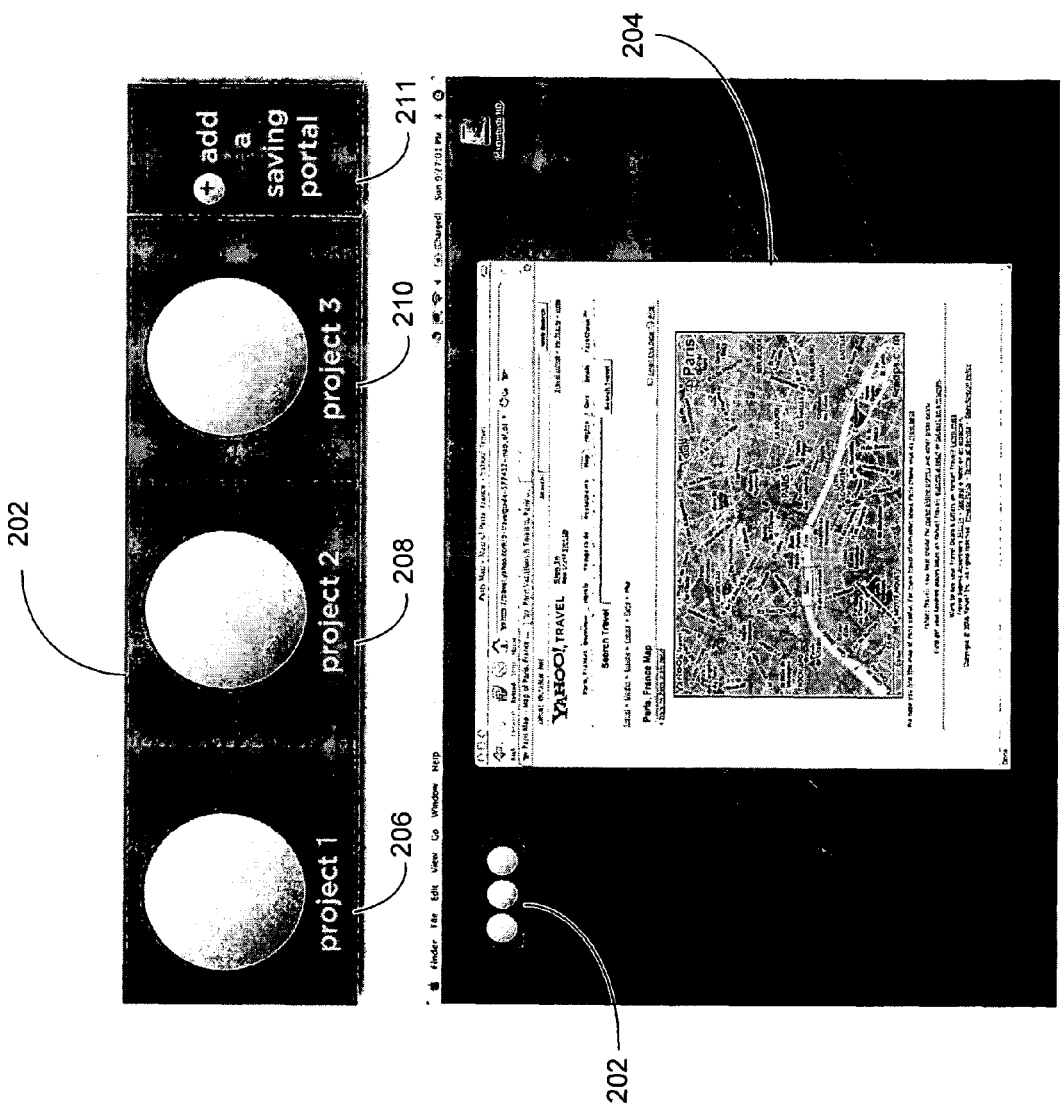
FIGS. 2A, 2B and 2C illustrate a method of collecting information according to an embodiment of the present invention.
Figure 2B:
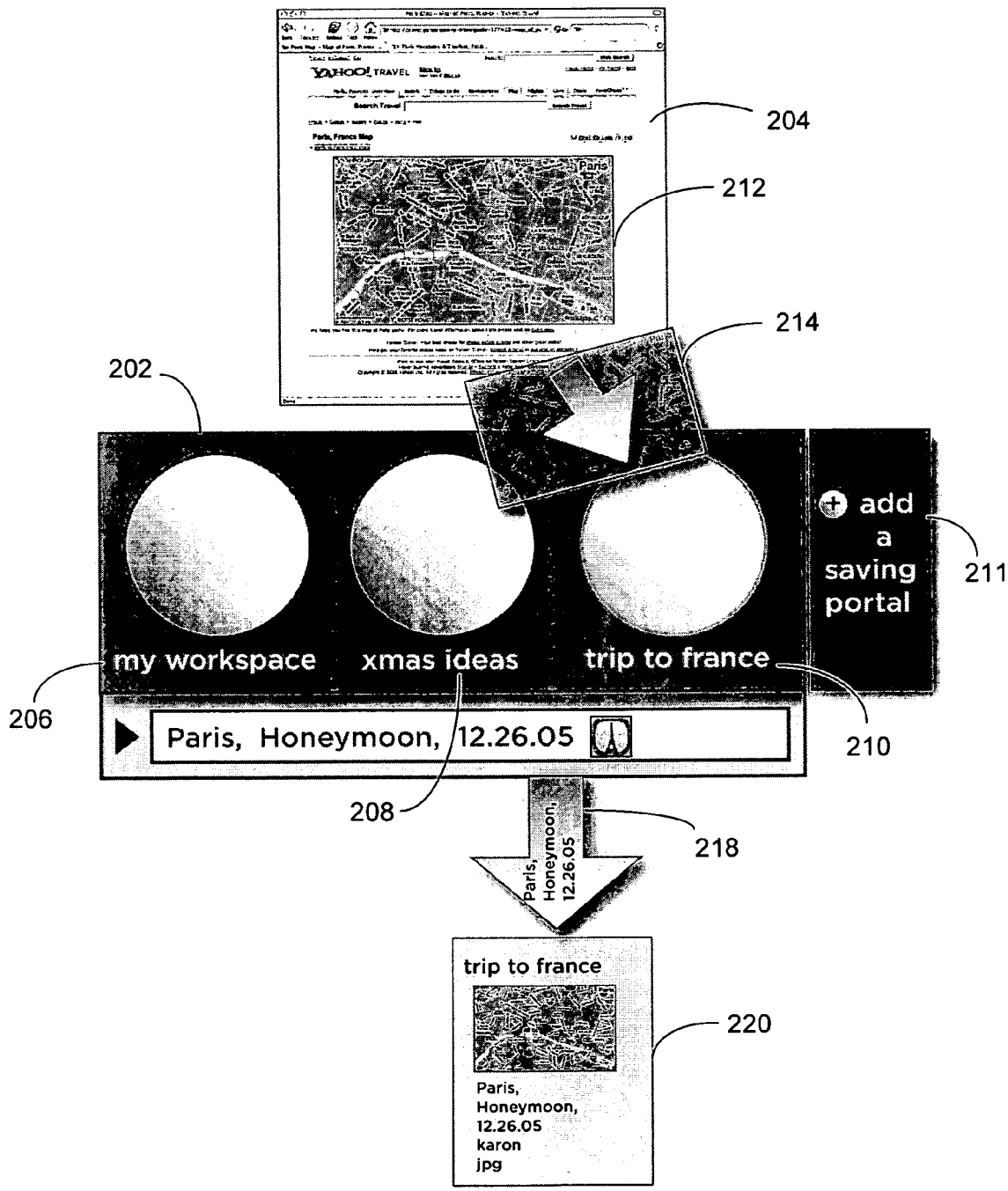
Figure 2C:
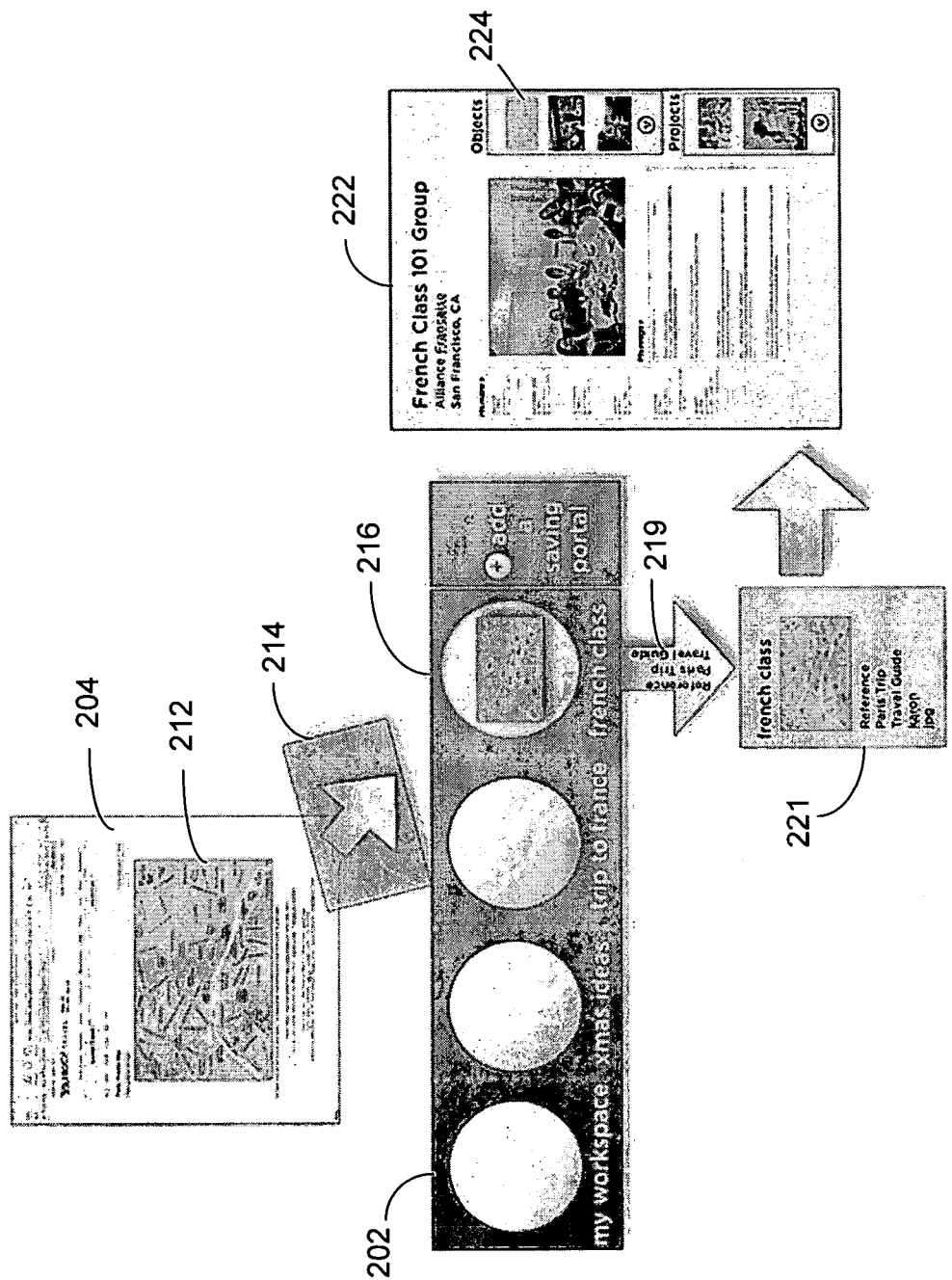

FIGS. 2A, 2B, and 2C illustrate a method of collecting information according to an embodiment of the present invention. As shown in FIG. 2A, a set of persistent saving portals 202 is displayed on a user's computing device along with a web page 204. The set of persistent saving portals 202 may include one or more persistent saving portals for storing and organizing information selected by the user. In this specification, a persistent saving portal is also referred to as a portal for short. In addition, the information saved in the persistent saving portal may also be referred to as one or more objects. In this example, each persistent saving portal is represented by a circle. In the enlarged view of the set of persistent saving portals 202, the three circles are labeled "Project 1" 206, "Project 2" 208, and "Project 3" 210 respectively. The user may add a new saving portal by using the "Add a Saving Portal" button 211. The user may also modify the labels to indicate the contents of the objects stored in each portal. For instance, the three circles representing the set of persistent saving portals 202 are labeled "My workspace" 206, "Xmas ideas" 208, and "Trip to France" 210 respectively in FIG. 2B. In this example, the portals are projects, which contain collections to be used for personal consumption. In another embodiment, one or more of these portals may be destinations, such as a group mailing list or a group website. For example, when a user drops a map onto a saving portal specified for a particular group, the map may be deliver it to the group's collection of objects.

In FIG. 2B, as a user browses the web page 204, the user may be interested to save the map 212 on the web page. To do so, the user may simply drag-and-drop the map to the relevant portal in the set of persistent saving portals 202. In this example, the map relates to "Trip to France" and it is stored in the portal 210. Item 214 illustrates the map 212 being dragged to the portal labeled "Trip to France." Note that any unit or type of information on the web page may be saved, including but not limited to photo, text, graphics, video, sound, URL, etc. Also note that objects collected and annotated in accordance with the present invention are not limited to objects on a website; the user may collect and annotate self-created information, such as a photo of a car taken by his cellular phone or a bar code of a product scan by the user. Such objects can be used to obtain further information the user is interested in.

The user may define a set of attributes to label the objects collected. These attributes are defined upon the collection of the objects, and they may be edited or modified any time afterwards. The set of attributes may include the key words and/or symbols the user may use to automatically annotate objects saved in a particular portal. For example, item 218 shows user-specified annotation terms, for example "Paris," "Honeymoon" that are used to label objects stored in the "Trip to France" portal. In addition, item 220 shows other implicit data, such as the user's name "Karon", the date the information is saved "Dec. 26, 2005", and the data type "jpg". These data are automatically attached to the information dropped in the portal without manual intervention. Note that other types of implicit data may be attached, including but not limited to time of the day, location, file type, file size, access permission, etc. Both the user-specified and the implicit terms of each object are considered as the metadata of the object.

Note that there are several ways of constructing and associating structural data when an object is being collected or gobbled. First, the URL associated with the object is analyzed to search for unique object identification that may be used to subsequently query a backend database. For example, a business in the Yahoo! local may have a unique ID in its URL. If a URL is identified as belonging to Yahoo! local (from the domain local.yahoo.com), then the identity in the URL, such as id=1234567, may be used to inquire the Yahoo! local web service/database for more information about that business, like the phone number, hours of operation, customer or expert reviews, all from the URL associated with the business.

Second, the object being collected may contain Microformats. Microformats are markups that allow expression of semantics in an HTML (or XHTML) web page. A gobbler application may extract meaning from a standard web page that is marked up with Microformats. Existing XHTML (and HTML) standards allow for semantics to be embedded and encoded within them. This is done using specific HTML attributes. Adding Microformats to a standard HTML web page allows machines to process HTML text and to possibly load data into remote databases. This would allow programs such as the gobbler application to find items such as contact information, events, and reviews on web pages.

Finally, one may use information analysis techniques, like LiveWords (http://desktop.yahoo.com) or term extraction (http://developer.yahoo.com) to analyze the text in the gobbled object to extract entities. The LiveWords feature gives a user a simple way to search the web for additional information the user may be interested in. Examples of entities include addresses, businesses and companies, which can then be applied in other queries to data sources such as Yahoo! local (for searching more business or company information) or in general web searches.

Such structured metadata may be applied in many ways (putting the gobbled information on a map for example, or into a calendar) and may also be gathered from the user's annotations or tags. For example, adding a text tag of "Palo Alto" may be used to geo-tag objects collected in a saving portal with the geo-coordinates of the city of Palo Alto, which is identified as a city by LiveWords.

The gobbler application allows the user to efficiently categorize the objects he has collected and to efficiently access such objects using the metadata that annotate the objects. Metadata may be added or deleted after the objects have been collected. For instance, when the user adds a new term to a project, all objects contained within the project may be updated with the term. In another approach, the user may elect to selectively add certain terms to the metadata of certain objects. That would require more steps on the part of the user to select and add the terms to the particular objects specified. The metadata may be implemented in the user's environment as a tag cloud or in other visual ways to support browsing and query the system for object and collection retrieval. As the user's collection of objects increases, the need for object and collection retrieval also increases. In addition, if the user's collection is published into a public repository, the metadata enables the clustering of like projects or collections and supports retrieval from multiple sources.

In FIG. 2C, a persistent saving portal "French Class" 216 is shown to collect information relates to the French Class 101 Group. The user may create multiple saving portals for each group the user belongs to. In this example, item 219 shows user-specified annotation terms, for example "Reference," "Paris Trip," and "Travel Guide" that are used to label objects stored in the "French Class" portal. In addition, item 221 shows other implicit data, such as the user's name "Karon", and the data type "jpg". These data are automatically attached to the map of Paris 212 that is dropped in the portal without manual intervention. After an object is collected in a saving portal, it may be broadcasted or distributed to a destination the user subscribes to via an RSS (Really Simple Syndication) feed or other means of transmitting information over the Internet. The RSS file format is a family of web feed formats specified in XML and used for Web syndication. RSS delivers its information as an XML file called an "RSS feed", "Webfeed", "RSS stream", or "RSS channel". These RSS feeds provide a way for users to passively receive newly released content (such as text, web pages, sound files, or other media); this may be the full content itself or just a link to it, possibly with a summary or other metadata.

In a typical use scenario, a content provider publishes a feed link on their site which end-users can add to an aggregator program running on their machine. Periodically (typically every 5-10 minutes, though most aggregators make this user configurable), the aggregator asks all the servers in its feed list if they have new content. If so, the aggregator either makes a note of the new content or downloads it. In this example, the map of Paris is routed to the French Class 101 Group's home page 222. On the French Class 101 Group's home page, objects that have been saved and projects that have been created by group members are shown. For example, the map of Paris the user just collected is posted along with other objects as item 224.

Figure 3:
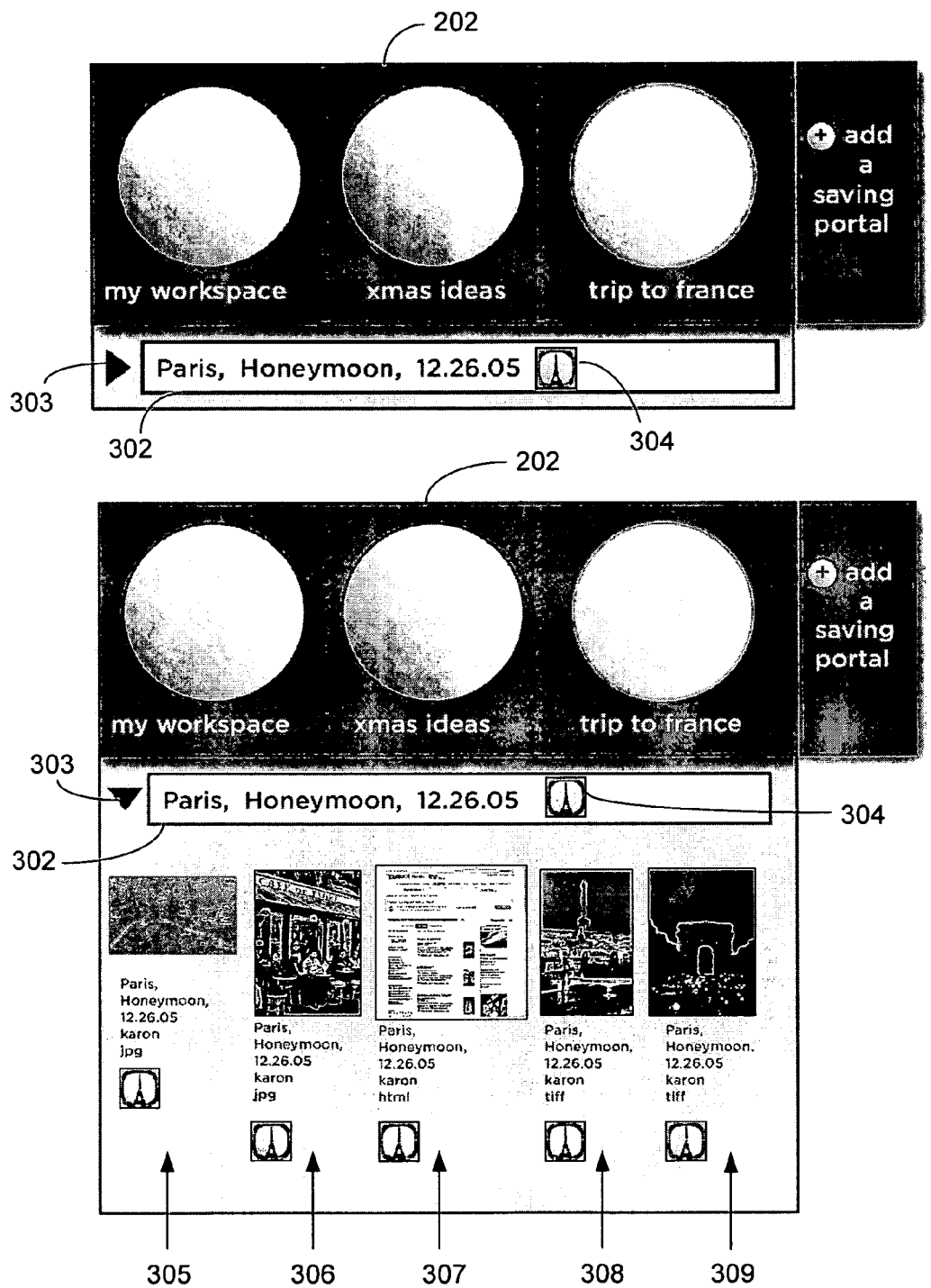
FIG. 3 illustrates a method of annotating information collected according to an embodiment of the present invention.

FIG. 3 illustrates a method of annotating information collected according to an embodiment of the present invention. In FIG. 3, a user-interface window 302 displays the user-specified annotation terms "Paris, Honeymoon, Dec. 26, 2005" of the portal "Trip to France." The user-specified annotation terms are entered by the user in an edit field at the time a saving portal is created. Note that these user-specified annotation terms may be revised using an edit operation subsequently. In addition to text, any media asset may be attached to an object as an annotation. In this example, a user-defined icon, a thumbnail of the Eiffel Tower 304, is used to label objects saved in the "Trip to France" portal. Also shown in FIG. 3, the user-interface window includes a display toggle 303. When the display toggle 303 points downwards, representative views and the automatically created annotations of the objects stored in the portal are displayed. As shown in FIG. 3, the numerals 305, 306, 307, 308, and 309 indicate the five objects collected. The objects collected in the persistent saving portals acquire both user-defined annotations and implicit annotations. In one implementation, each object is unique in that a unique identifier is assigned to it. The thumbnail of Eiffel Tower 304 is attached to each object. The user-defined icon allows for better organization and annotation of the objects collected in the portal. In another embodiment, a person's picture may be used as the user-defined icon to label information received/collected from that person. Note that such support for non-textual metadata enables query and retrieval of objects using properties, like computer vision, of the objects. For example, the ability to search color properties of an image or to search shapes of graphical objects may result in a different set of objects than simply search objects annotated with textual terms.

One aspect of the present invention is that the annotation data are attached to the objects collected in the portal automatically, without manual intervention after the initial setup, based on the terms defined by the user, also known as user-specified terms, when the portals are initially set up. Other implicit terms, such as the user's name, are determined from the owner or login of computing device. The file type is determined from the source of the data or provided by the URL of the data. In addition, the computing device can provide other types of implicit data, such as the date, time of the day, access permission, etc. The user-specified and implicit annotation data, also known as the metadata of the objects, are made available to the user and can be attached to the objects collected when the object is transferred from one person to another.

In one embodiment, when an object is transferred from one person to another, the method accumulates new metadata to the existing metadata that has already been attached to the object. Thus, the method assigns a set of unique metadata to each object. In such a way, the metadata supports citation and copyright requirements as well as delivery of context. The user may used the metadata to find the original website where an object was collected from, and allows the user to retrieve other information from the website if necessary. This method of gathering and annotating information supports the creation of derivative works by the user. This is because not only the method supports adding metadata to each object gathered, it also maintains the history, authorship, context, and location of the metadata.

Figure 4:
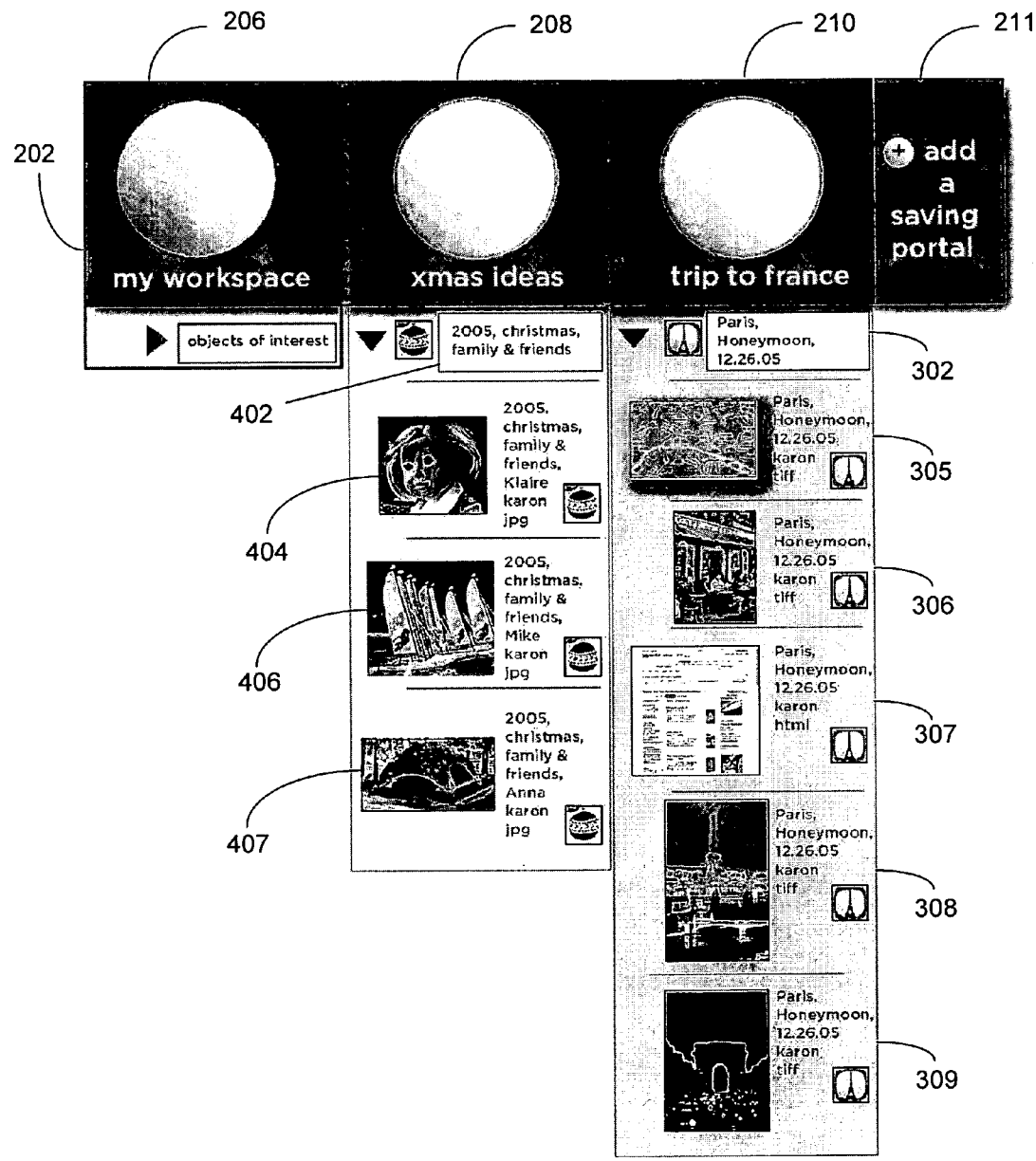
FIG. 4 illustrates examples of the objects collected in each persistent saving portal of FIG. 2 according to an embodiment of the present invention.

FIG. 4 illustrates examples of the objects collected in each persistent saving portal of FIG. 2 according to an embodiment of the present invention. As shown in FIG. 4, both the "Xmas ideas" and "Trip to France" portals are open. The objects in the "Trip to France" portal are similar to the ones shown in FIG. 3. For the "Xmas ideas" portal, the objects are annotated with user-specified terms "2005, Christmas, family & friends" 402. The "Xmas ideas" portal includes three gift ideas, namely a doll for Klaire 404, a sail boat for Mike 406, and a tent for Anna 407. The user-specified terms "2005, Christmas, family & friends" and implicit terms "Karon" and "jpg" are automatically generated and attached to each of the gift ideas. The name of the receiver of a gift, such as Anna, is provided by the user as a user-specified term. In the portal "My workspace," the user may store various work related information, including for example "Objects of interest." In this manner, the portal acts as a library for storing a collection of information that is relevant to the user's work. Potentially usefully and yet unstructured objects, or ideas in progress may be collected in one or more of such "Objects of interest" saving portals. These saving portals allow the user to collect he has not yet decided how to use, but he thinks the objects may be useful, and the user may organize such objects later into collections.

Note that the objects collected in the portals are more than lumps of text and pictures. These objects may be used in conjunction with other information available to an Internet content provider to provide additional information, goods, or services to the user. For example, the objects collected in the "Xmas ideas" portal may be linked to the shopping domain 106 of FIG. 1. In this manner, the user may be able to find the dealers in the local area that sell the sail boat. In addition, information may be provided to the user to allow him to compare features and prices for different models of sail boats. Information about the accessories of the sail boat may also be provided to the user to further enrich the user experience of the sail boat. Such information may be displayed in certain ways, such as a grid, or ranked by particular criteria, for example price, selected by the user. The way the objects are collected and annotated enables information to be viewed in different intelligent ways.

For another example, conventionally when people see an address on a webpage, they either manually cut-and-paste the text into another document or manually write down the address on a piece of paper. Converting this address into an address-book item involves a number of tedious and time consuming steps. With the present invention, the addition of the metadata enables the object to provide the related context. For example, this address object may be linked to the Maps domain of an Internet content provider to obtain the name, phone number, location, and driving directions to the business at this address, or linked to the News domain of an Internet content provider to obtain additional information about the business at this address.

Figure 5:
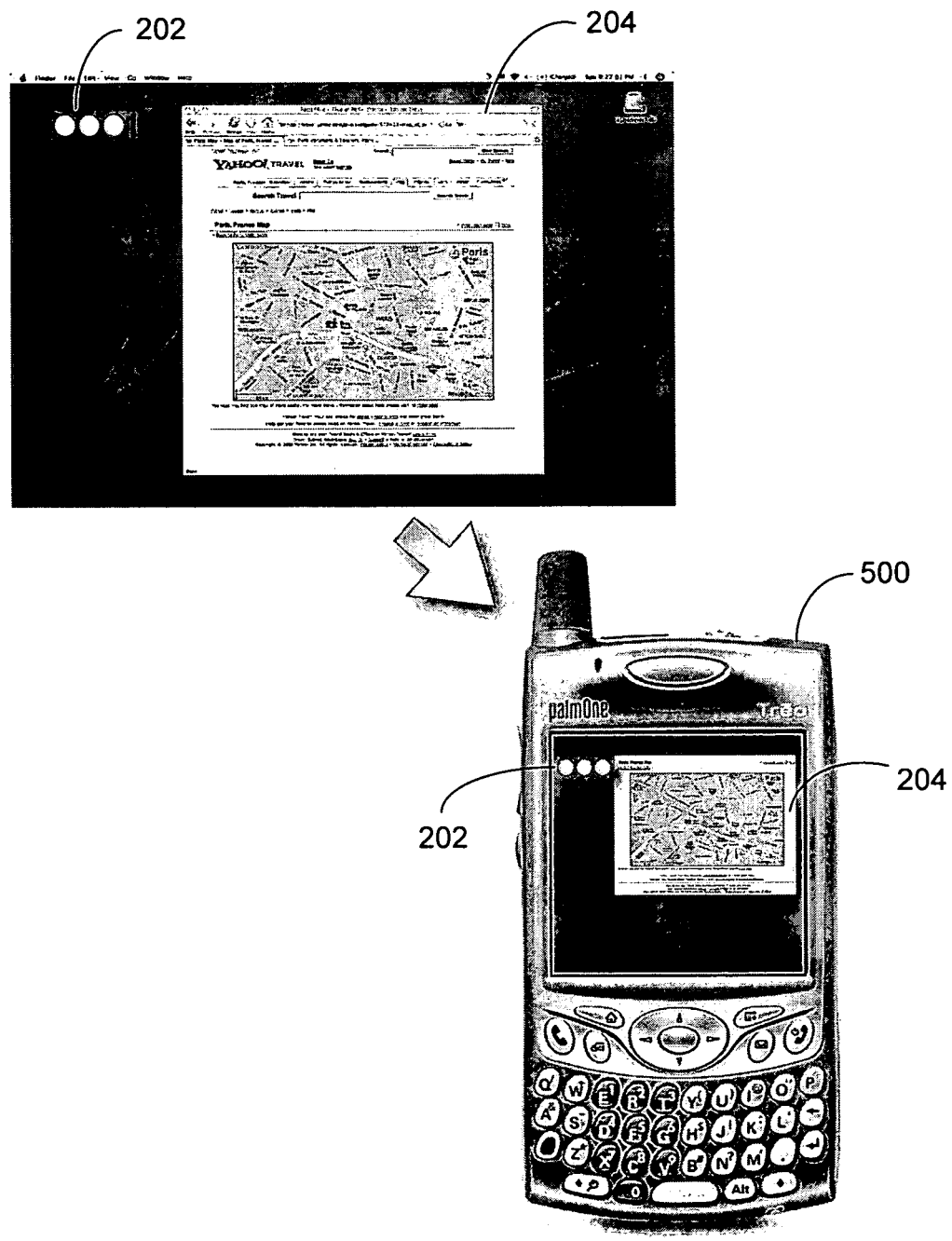
FIG. 5 illustrates a mobile device running the applications described above according to an embodiment of the present invention.

FIG. 5 illustrates a mobile device running the applications described above according to an embodiment of the present invention. In this example, the mobile device 500 is the palmOne device made by Palm, Inc., of Sunnyvale, Calif. Note that the applications described above may be run on different form of user devices, in additional to the traditional desktop computing devices. This capability allows users to have multiple access points to information saved in the portals anywhere and anytime. To accomplish the capability of maintaining persistent saving portals, the objects contained in the persistent saving portals of a client device (e.g. desktop or mobile device) are saved and mirrored online in servers 102 and databases 105 of FIG. 1. As a result, a user can have universal access to the information saved in the persistent saving portals via an Internet content provider's network.

The benefit of having universal access to the persistent saving portal by different user devices can be illustrated by the following example. Assuming a user made a travel arrangement from his desktop computer at home and saved the itinerary in a persistent saving portal. While traveling, the user may access the itinerary saved in the persistent saving portal using a mobile device. For example, the user may obtain the hotel address with his mobile device. From the hotel address, the user may obtain map information and driving directions to the hotel through the Maps domain of the Internet content provider. Thus, the capability of having universal access to the persistent saving portals enables the user to navigate to his destinations. In one approach, the user may harvest information into one of the saving portals using their mobile device. For example, the user may scan a bar code, take a photo or video and immediately add the object to the portal with metadata. The application may apply the geo-location of the user automatically to assign implicit data to a photo in a saving portal, for example, photo taken in Paris would go into the Trip to France portal while the user is traveling in Paris.

In one embodiment, a portal may be shared among multiple users. For example, user A and user B are working on different portions of a same project, and user B depends on the output of user A to continue his work. Each time user A finishes a task, he may place the task in a first shared portal such that user B may receive a notification of user A's status and retrieve the information from the first shared portal. Similarly each time user B finishes a task, he may also place the task in a second shared portal such that user A may receive a notification of user B's status and continue to supply new tasks to the first shared portal. The ability to share information collected may be done with an individual object, with a set of objects, or with the user's collection of objects in all saving portals. The user may define a customized sharing model for each portal, namely public, private, or to my friends only.

Figure 6:
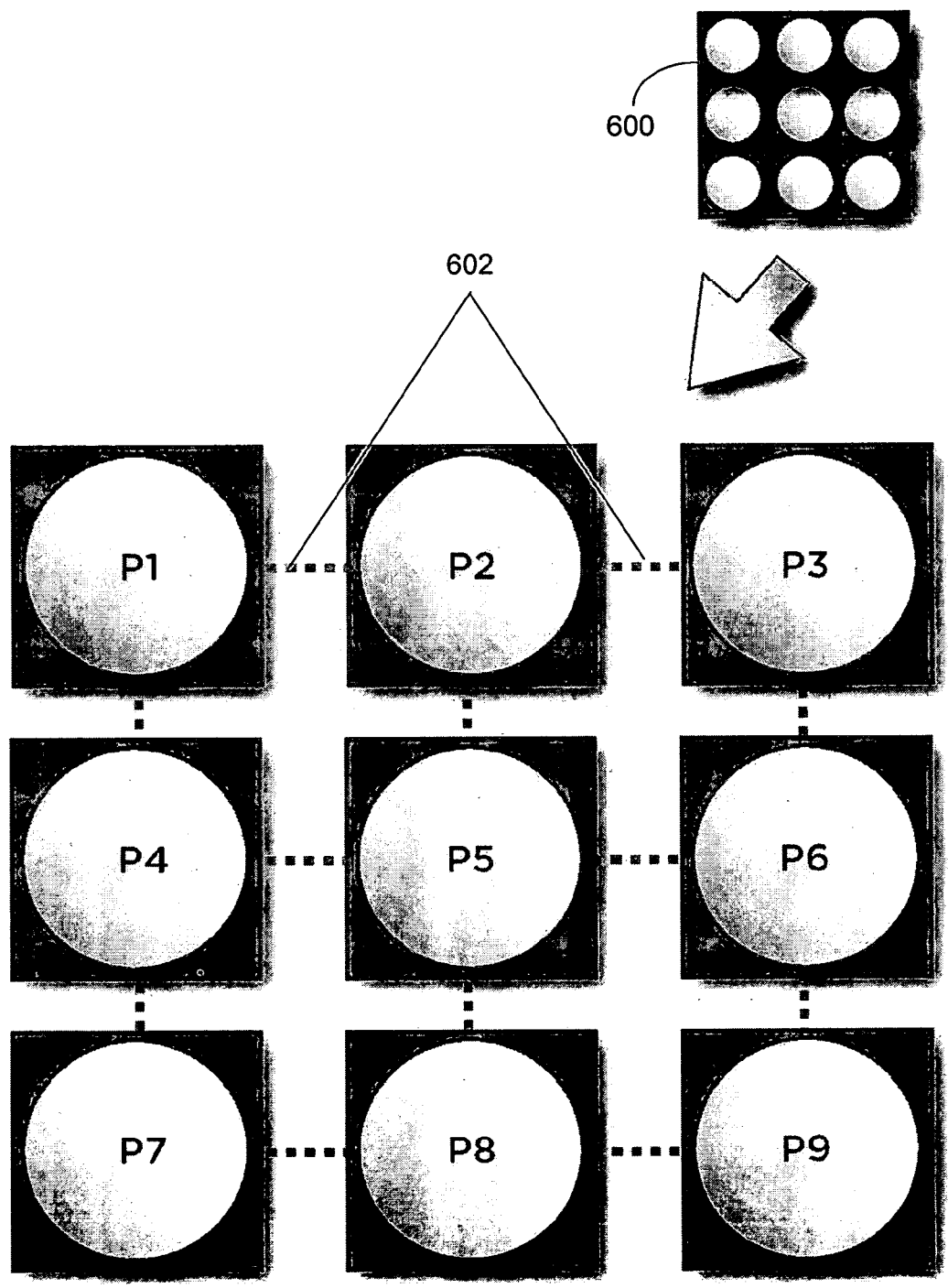
FIG. 6 illustrates another set of persistent saving portals according to an embodiment of the present invention.

FIG. 6 illustrates another set of persistent saving portals according to an embodiment of the present invention. In the example shown in FIG. 6, a thumbnail image 600 and a corresponding enlarged image of nine portals are provided. Each portal may be used to store different information selected by the user, and each portal may be customized to support different user-specified annotations for collection of different information. Each persistent saving portal may be linked to other portals through links (indicated in dotted lines) 602. A large number of persistent saving portals can be employed to allow the user to customize different sets of objects. Each portal provides a pre-determined area for storing information in real time seamlessly without the user having to stop and annotate each item saved in the portal. Each portal may be implemented as a widget and the user may combine multiple widgets to satisfy to different needs and purposes. In an alternate approach, the user may use a single widget to implement multiple portals to satisfy the different needs and purposes.

In one embodiment, the browser and the information gathering application (also referred to as the gobbler application) may be implemented with JavaScript running on the user's computing device, such as a desktop personal computer. The gobbler application presents a user interface for collecting information, which is shown as one or more saving portals 206, 208, and 210 as in FIG. 2A, and listens for data to be collected on a Transmission Control Protocol/Internet Protocol (TCP/IP) port using a dynamically linked library (DLL). In this example, either the web site provides the JavaScript or it is injected into the page using a bookmarklet. A bookmarklet is a small JavaScript program that can be stored as a URL within a bookmark in most popular web browsers, or within hyperlinks on a web page.

The browser JavaScript creates a Flash object and parses contents of a web page into a plurality of collectable objects, creating collectable objects that may be selected, dragged, and dropped to a saving portal. A user may gobble data by dragging and dropping one or more collectable objects of the web page onto a saving portal, or by clicking on an action button near that element in the page. As objects are gobbled, the JavaScript in the web page uses the Flash object to establish a connection to a widget running on a predetermined TCP/IP port. The JavaScript then sends the data about the object being gobbled over this TCP/IP connection. The receiving widget processes the object by annotating it with various attributes, such as time, date, etc. The receiving widget then sends the object to a backend server for storage and further processing. The further processing includes analyzing the source of the object to establish other metadata related to the object that may be collected.

The JavaScript in the widget contacts the gobbler service using the XMLHttpRequest (XHR) or other similar techniques to add the object to the appropriate user's store. XHR is an API that can be used by JavaScript, JScript, VBScript and other web browser scripting languages to transfer and manipulate XML data to and from a web server using HTTP, establishing an independent connection channel between a web page's Client-Side and Server-Side. The data returned from XMLHttpRequest calls may often be provided by back-end databases. Besides XML, XMLHttpRequest can be used to fetch data in other formats, e.g. JSON or even plain text. XMLHttpRequest is a part of the Ajax web development technique, and it is used by many websites to implement responsive and dynamic web applications.

In another embodiment, the gobbler application includes only JavaScript running in the browser of a user's computing device. Similarly, in this example, either the web site provides the JavaScript or it is injected into the page using a bookmarklet. The browser JavaScript parses the web page, creating collectable objects that may be selected, dragged, and dropped into a saving portal. In addition, the browser JavaScript creates new page element presenting a user interface comprising one or more saving portals for collecting information. Users may gobble data by dragging and dropping the collectable objects of the web page onto the gobbler part of the page or by clicking on an action button near that collectable object in the page. As objects are gobbled, the JavaScript annotates the object with various attributes, such as time, date, etc. The page JavaScript then sends the object to a backend server for storage and further processing. The further processing includes analyzing the source of the object to establish other related metadata that may be collected. The JavaScript in the web page contacts the gobbler service using the XHR or other similar techniques to add the object to the appropriate user's store.

In yet another embodiment, the Yahoo! widget engine described below may be used to implement the persistent saving portals of the present invention. Persons of ordinary skill in the art would appreciate that other implementations or other types of widget engines may be used to implement the persistent saving portals. In addition, in the following discussions, mothods of constructing and using the widgets are described for computing devices running Windows operating system. Persons of ordinary skill in the art would understand that similar implementations may be done for the Macintosh, UNIX, or Linux operating system.

The Yahoo! widget engine, also referred to as "widget engine" or "engine" in this document, uses the Extensible Markup Language (XML) to define widgets and objects. This language forms a clear hierarchical structure for each object, the order the object is drawn in, and the order to associate the attributes of each object. An example of a widget is shown as follows:

```
<widget debug="on">
<window title-"Sample Yahoo! Widget">
<name>main window</name>
<width>500</width>
<height>500</height>
<image src="Images/Sun.png" name="sun1">
<hOffset>250</hOffset>
<vOffset>250</vOffset>
```

```
<alignment>menter</alignment>
</image>
<text data-"Click Here" size="36" style="bold">
<name>text1</name>
<hOffset>250</hOffset>
<vOffset>100</vOffset>
<alignment>menter</alignment>
<onMouseUp>
sun1.opacity = (sun1.opacity / 100) * 90;
</onMouseUp>
</text>
</window>
</widget >
```

The widget reduces the opacity of an image by 10% every time the user clicks on the text that says "Click Here." This sample widget is used to illustrate a few points. First, the structure of the widget uses a symmetrical language XML such that each object specifier (e.g. <text>) has a corresponding terminator (</text>). Within these pairs of specifiers and terminators, the attributes of the objects are defined, such as screen positions, alignments, etc. Second, objects defined in XML may be manipulated in JavaScript. Third, the name of objects begins with a letter. Only letters, numbers and underscores are allowed for a name. The XML description of a widget is stored in a file with the extension .kon. In practice, a widget may have many images and text objects, multiple JavaScript sections, and may create new objects at runtime using JavaScript to implement complex functionality. The following sections describe various embodiments of techniques and codes for creating a new widget.

There are two styles of tag notations in terms of the XML syntax, which are:

```
<image>
<src>images/image.png</src>
<name>myImage</name>
</image>
or:
<image src="images/image.png" name="myImage"/>
```

A user may mix and match the two tag notations as follows:

```
<image src="images/image.png">
<name>myImage</name>
</image>
```

Entities are an XML construct that allows a user to specify a character via a special escape sequence. Some characters that are used to parse the XML syntax are considered reserved. The symbol & is used as the entity escape start (and for that reason is also a reserved character). The standard set of entities is used to represent XML special characters:

```
& &
" "
&apos: '
< <
> >
```

A user may also use entities to specify a character by its unicode code point:

```
<space character, decimal>
<space character, hex>
```

Since the XML engine looks for the < and > symbols to mark blocks of XML data, the JavaScript engine needs to have these symbols replaced with & lt and & gt respectively. For example:

```
<onMouseUp>
if (x < 5)
displayResults( );
</onMouseUp>
```

Alternatively, the user may use XML comments to hide the JavaScript code from the XML engine as is commonly done in HTML:

```
<onMouseUp>
<!--
if (x < 5)
displayResults( );
//-->
</onMouseUp>
```

In yet another approach, the user may use CDATA sections as follows:

```
<onMouseUp>
<![CDATA[
if (x < 5)
displayResults( );
]]>
</onMouseUp>
```

These alternative approaches make the code easier to read. In yet another approach, a user may put the XML parser in a "strict mode," which enforces the rules of XML in ways the parser normally does not do. To enable the strict mode, the following line is added to the top of the XML file:

```
<?konfabulator xml-strict="true"?>
```

In the strict mode, the following aspects of the program are enforced: 1) All attribute values are put into quotes; 2) No stray "&" characters are allowed in a normal text section; 3) Entities (things that start with "&") are evaluated inside attribute values; 4) No double dash ("- -") allowed inside a comment. For this reason, it is preferable to put code into CDATA blocks; and 5) If an external file is included, there is no need to replace entities such as & It in that file.

File paths in the widget engine are relative to the location of the XML file. This means a file reference without a directory (e.g. main.js) will be searched in the same directory as the XML file while one with a directory (e.g.javascript/main.js) will be searched in the specified subdirectory of the directory where the XML file resides. It is preferable not to use absolute paths (e.g. ones that begin with a /) since the disk layout of different computers may differ greatly.

In Windows machines, the files that make up a widget are stored in a widget file. This is a standard ZIP file that has had its extension changed to widget. The Windows versions of the widget engine can read the zipped up widget files. This is also the format of choice when creating cross-platform widgets. In one example, a widget bundle has the following structure:

```
myWidget.widget
    Contents
        myWidget.kon
        Resources
            <any files used by the widget>
```

The .kon file contains the actual widget code (similar to the sample widget in the section above). In one implementation, the .kon file is contained in the Contents folder. A user may put resources, such as pictures, in it. Typically, the resources would be put into a Resources folder, as shown above.

If the user does not use the widget converter and instead decides to zip the files manually, this may be done on a Windows computer by right-clicking the widget folder and creating a ZIP file from that. It should be noted the user does not need to create a zipped up widget file for testing each time the user makes a change while developing the widget. The user may double-click the .kon file to achieve the same effect.

Note that the widget package should not be modified at run time. In other words, one should not use the widget package to store information inside of itself. While many widgets use preferences to store their settings, a widget may store information inside its own package. In addition, when the widget engine runs a zipped widget, it first unzips it into a special location and then runs it from there. This unzipping happens every time one runs the widget, so if information is stored in the widget's unzipped package, it may be overwritten. To accommodate widgets that need to store permanent data, a system widget DataFolder folder path may be used to store a widget's permanent information.

In yet another embodiment, a widget engine may support a flat-file format that is not zipped. When the flat-file format is not compressed, the size of a widget is larger than the size of the widget in the zip format. Since images take up most of a widget's size, the increase is about 15% on average because images are normally already in a compressed format (PNG, JPG) while text files are typically not compressed. The benefit of having the files compressed is that there is no need to store the files in RAM until actually needed because the files are file-mapped. By using this new format, the time for launching a widget application is reduced.

When a widget uses a flat file format, items such as Dynamic-Link Libraries (DLLs) that may have been packaged with the widget may not be used unless a new API (widget.extract File ( ) ) is used to extract the file out of the flat-file widget into a location in the file system. One exception is that sound files played through the play ( ) function may work without any changes.

This section discusses how widgets are run and some of the issues that need to be addressed. When a widget is opened, it is run as a separate process. This is done to ensure one widget does not affect the rest of the widgets that a user may use. A widget that is in zip format is unzipped into a special location (C:/Documents and Settings/<user>/Local Settings/Application Data on a PC). A widget that is not zipped is run from where it is located. For this reason, one may not rely on where the widget is. Once the .kon file is located in the widget, the current directory is set to the directory in which the .kon file is located. So for example, if a .kon file is in the Contents folder, the current working directory would be Contents. This allows relative paths to Resources to function properly. A .kon file would reference an image as Resources/Image1.png, for example, if its images are in the Resources folder in Contents folder.

When the .kon file is located and the current directory is set, the file is parsed and the objects defined therein are created. After everything is created successfully, the onLoad handler is called. Then the widget runs the initialization routine. Note that the onLoad handler is typically executed before the widget is made visible. In other words, many widgets set their window to be hidden at first and become visible upon complete execution of the onLoad handler. After the onLoad handler is run successfully, the widget is up and running. Note that the next time the widget is run, it is unzipped again. For this reason, one cannot rely on storing information in the widget bundle. Instead, it is preferable to store information in the widget's DataFolder as discussed previously.

The widget engine keeps track of what widgets may be opened automatically. The next time the widget engine is launched, it automatically reopens any widgets that were running at the time when the widget engine was last shut down.

Actions are important in widgets because they are where a user defines how a widget behaves when he interacts with the widget. In one implementation, an action is specified by setting the action to certain JavaScript text. This text is evaluated and run when the user clicks, for example:

```
<onMouseUp>
print( "hello" );
</onMouseUp>
```

However, there are at least two limitations: 1) the user may not use the JavaScript 'this' object to refer generically to the object for which the action was running; and 2) if the user has several objects with the same code, he may have to duplicate the JavaScript and change the names of the objects to reflect each object to which he has attached the code.

To remedy these limitations, the widget engine supports proper JavaScript functions for these actions. For example, no parameters are sent to the actions. In addition, an onMouseUp handler may receive the x and y coordinates of the mouse instead of inspecting system.event. To use functions, a user may either use a function in the XML (by using an attribute), or set the property to the function to call in JavaScript, as shown below:

```
<!-- In XML -->
<onMouseUp function=" myMouseUp"/>
// in Javascript
myImage.onMouseUp = myMouseUp;
// and someplace in the JS code, the function need to be defined:
function myMouseUp( )
{
print( this.opacity );
}
```

In the XML description, a user may set the <name> property. This defines the global JavaScript object that may be created and bound to the object of which the name is a part. For example, the code

```
<window name="mainWindow".../>
``` creates a JavaScript variable at the global scope with the name main Window. Note that all names need to be unique. In addition, since internally these names are used to track objects, they cannot be changed. The widget engine enforces this by making all name properties read-only. When a user creates an object on the fly using JavaScript, the object is given a generic name, such as Image001.

Some provisions are made for debugging the widgets. There is an XML tag "debug" that a user may set to "on" for debugging purposes. When the "debug" tag is set to on, a debug output window will open when a widget is launched. Calls to log( ) or print( ) in the JavaScript code are routed to this debug window. Any errors encountered inside the widget engine are also reported in this window. Note that the debug window will not open unless the debug tag is set to on.

While developing a widget, it is preferable that the debug tag is turned on so that it can inform the user about errors that occurred while the widget is running. For example, if an attribute is spelled wrong, the output window informs the user about this error, along with where in the code the problem may be found.

There are two types of security windows that may appear in the widget engine. The first is a first-run/modification window. On a first run of a widget that the widget engine has not seen before, a window appears to inform the user that a new widget is about to open and ask the user to confirm the action. This is to protect against widgets that may just run without the user's knowledge. Also, if the user allows a widget to run and subsequently the widget is modified, another window appears the next time the widget is launched, informing the user about the modified widget. Again, the user may confirm or deny the request to launch this modified widget.

If a user is in the process of debugging a widget, the user may turn on the debug mode, which may suppress the first-run/modified security windows. Thus the user is not interrupted every time the user modifies the code and reloads the widget.

The second type of window is a 'sandbox' window. In one approach, the sandboxed action relates to user's login to his Internet content provider account. The first time a widget attempts to login to his account, a window will appear to alert the user of this fact and ask whether the widget should be granted permission to use the user's data on the account.

In the preceding paragraphs, extensive details about a method and system for collecting and saving data objects on the Internet have been disclosed. The method includes parsing contents of a web page to form a plurality of collectable objects, storing the one or more objects to one or more saving portals, annotating the one or more objects in accordance with user-specified data, and annotating the one or more objects in accordance with implicit data of the one or more saving portals. Once the data objects and their corresponding metadata are made available, such information can be utilized to solve real information-based problems. One of the applications is to identify correlations between data objects using their corresponding metadata and to present information about the data objects in multiple views simultaneously according to the correlations between the data objects.

The capability of presenting information with multiple views delivers additional context about the data objects to users based on the information derived from the data objects and their corresponding metadata. Each of the views can provide specialized properties that can be utilized to support unique tasks. For example, calendar views are useful for illustrating time-based events, and map views are useful for illustrating geospatial relationships, etc. The following sections describe a method and system for presenting information in a display that consists of at least two views and for delivering correlated information to users in a sensible and useful manner using a combination of the specialized views.

Figure 7:
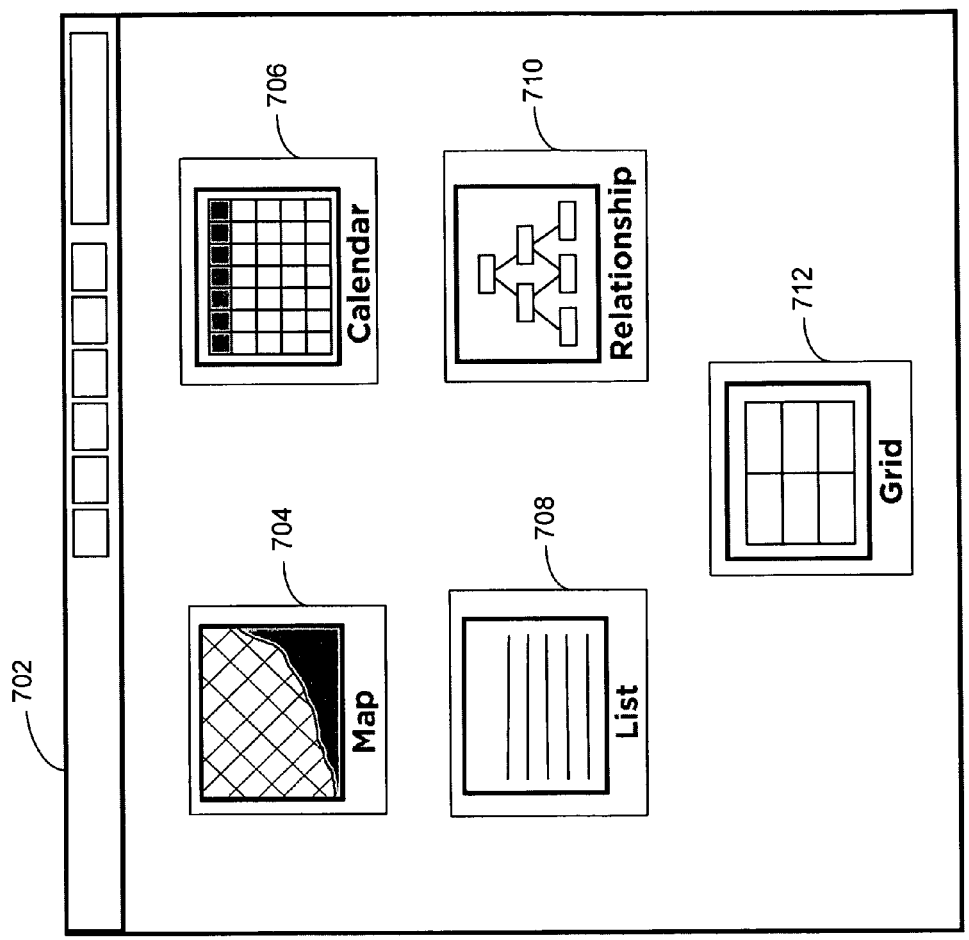
FIG. 7 illustrates a method for presenting information on a user device according to an embodiment of the present invention.

FIG. 7 illustrates a method for presenting information with multiple views on a user device according to an embodiment of the present invention. In this example, a user device 702 may display the same set of data objects in multiple views, and thus expands the amount of information to be conveyed to the user. For example, the set of data objects may be displayed in one or more views, such as a map view 704, a calendar view 706, a list view 708, a relationship view 710, and a grid view 712. The multiple views of the data objects are enabled by using the metadata created during the data collection and data annotation processes. The metadata describes the implicit and/or explicit relationships and forms the link between the different views of the data objects. One of the benefits of presenting information in multiple views is to provide the user with the most intuitively understandable way to view a piece of information. Another benefit is to give the user a choice of viewing the information in a user-preferred manner. The following paragraphs describe some of the exemplary views according to embodiments of the present invention.

Figure 8:
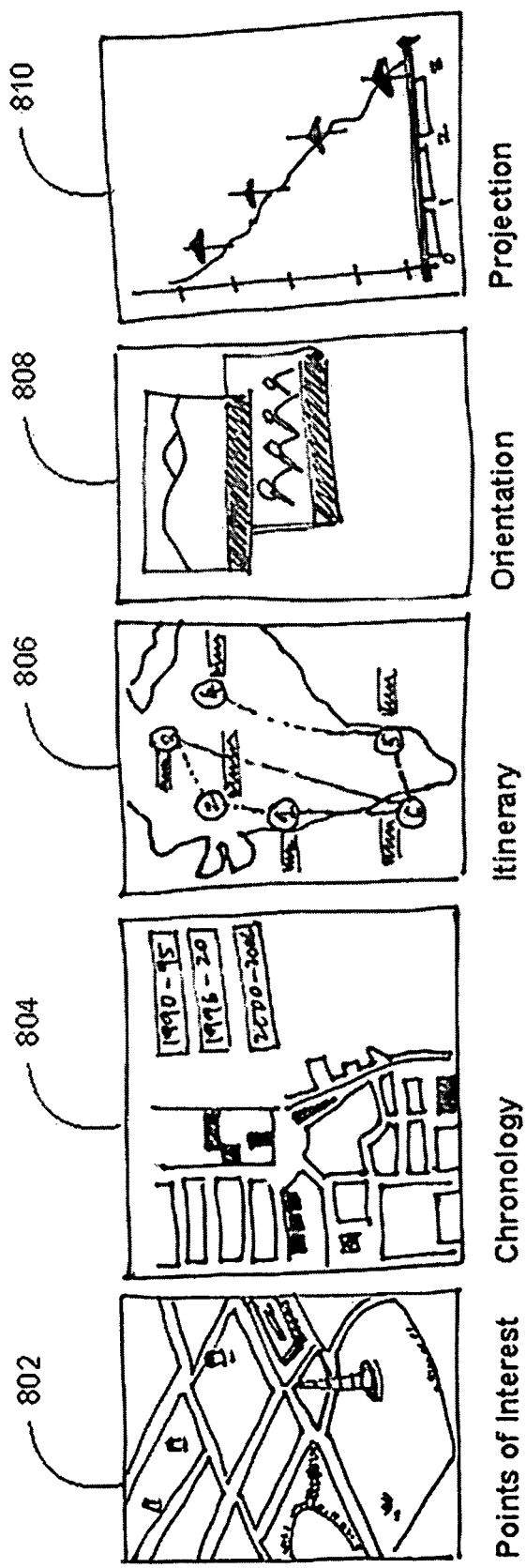
FIG. 8 illustrates exemplary presentations of maps according to embodiments of the present invention.

FIG. 8 illustrates exemplary presentations of maps according to embodiments of the present invention. As shown in FIG. 8, a map may be presented from the perspectives of points of interest 802, chronology 804, itinerary 806, orientation 808, and projection 810. In the view of points of interest 802, multiple points of interest are displayed in a bird's-eye view. In the view of chronology 804, chronological developments of the area are shown in the map. For example, areas developed in different periods of time may be coded in different colors. In the view of itinerary 806, an itinerary of the routes to be traveled is displayed on a map. In the view of orientation 808, different orientations of a particular location are displayed. For example, the views of a location in the north, south, east, and west directions may be displayed in the map view. In the view of projection 810, projections of land formation over time are displayed in the map view. As shown in the example above, it is more effective to communicate different types of information with different views of a map. A latitudinal/longitudinal coordinate provides ways of viewing geospatial information. It delivers distance, density, routing, coordinate space, or height information. The map view is specialized in that it can take other relevant information, such as locations over time, and show a two-dimensional display that aggregates time and space.

The application is able to take geo-spatial information, whether it be latitude or longitude, or in the form of an explicitly generated map location, and to display information related to that location and multiple views related to the location. In this example, when the user sees a point of interest such as the Washington Monument, the user may also want to look at it from the perspective of different orientations. Thus, a bird's-eye view of the Washington Monument from north, south, east, and west would be interesting to the user. The application can provide the user with contextual views of the Washington Monument based on the user's location in space. Using the capability of displaying different map views based on the contextual information the user is interested in, more information can be conveyed to the user.

In one embodiment, a map view may be generated through the Yahoo! Maps Application Programming Interfaces (APIs). A user can plot points on the map view with features such as custom descriptions, URLs, labels, groups, and icons. Alternatively, a satellite or a hybrid view can be displayed in lieu of the map view. Longitude and latitude coordinates are used to plot a point on the map view through the Yahoo! Maps APIs. Alternatively, an address may be used so that a built-in Yahoo! Map's Geocoder can generate the requisite longitude and latitude coordinates.

The Yahoo! Maps APIs are available in four variations, namely the Simple API, the Flash API, the Asynchronous JavaScript (AJAX) API, and the Image API. The Simple API enables a user to overlay custom map data on a Yahoo! Map without programming. The Flash API enables a user to embed maps in the user's web site or application using the Macromedia Flash technology. The Flash API has three variations: a) the AS-Flash API allows a user to create a Macromedia Flash application to display a map using ActionScript; b) the JS-Flash API allows a user to create applications quickly with scriptable Flash maps and JavaScript without Flash programming; and c) the Flex API allows a user to create more powerful applications with Macromedia's Presentation Server Technology. The AJAX API enables a user to use DHTML and JavaScript to host his own maps. Other aspects of the AJAX API are similar to the Flash API. The Image API enables a user to stitch image tiles together to build his own static map images by using the Geocoding API to transform physical addresses into encoded latitude-longitude (geocoded) responses.

Figure 9:
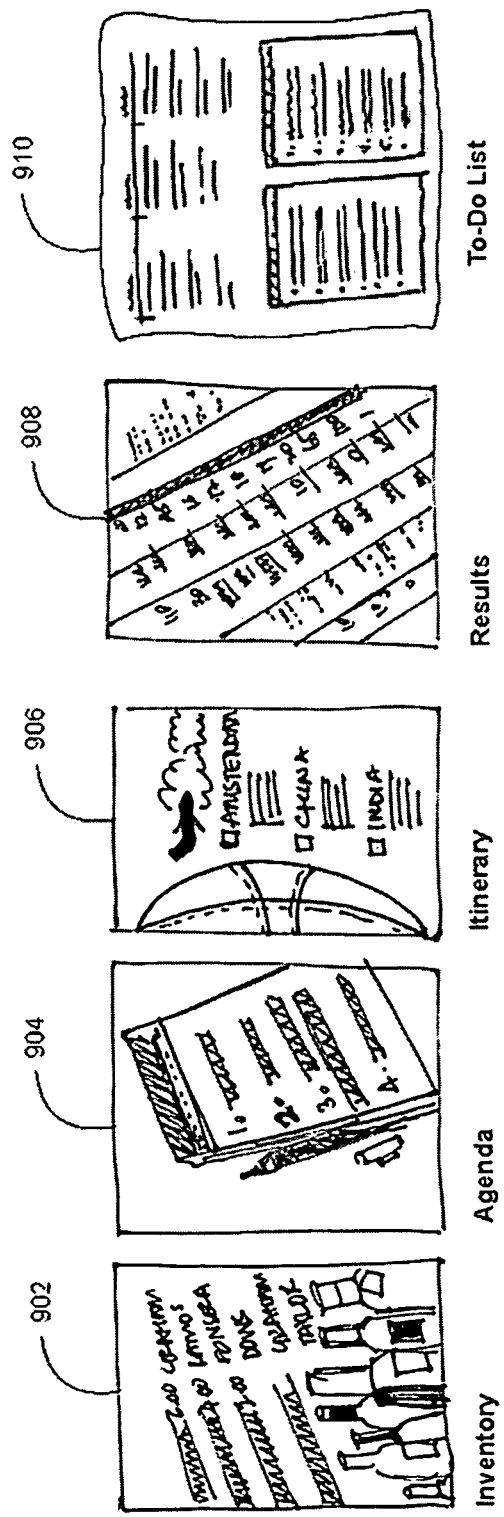
FIG. 9 illustrates exemplary presentations of lists according to embodiments of the present invention.

FIG. 9 illustrates exemplary presentations of lists according to embodiments of the present invention. In the example shown in FIG. 9, a list may be presented from the perspectives of inventory 902, agenda 904, itinerary 906, results 908, and to-do list 910. A list may be sorted to give the user the ability to make comparisons. For example, a list of inventories may be sorted to show which items are in demand and which items are not. A list of itineraries may be sorted to show which location the user would stay the longest or which parts of the trip are most costly. A list of stock market results may be sorted alphabetically to allow the user to find the company of interest more easily. In one embodiment, a list view is generated through the Hypertext Markup Language (HTML) List elements. The HTML language offers authors several mechanisms for specifying lists of information. A list may consist of one or more list elements. In addition, a list may include a) unordered information, b) ordered information, and c) definitions. In one example, an unordered list may be created with the unordered list (UL) element:

```
<UL>
<LI>Unordered information.
<LI>Ordered information.
<LI>Definitions.
</UL>
```

An ordered list may be created using the ordered list (OL) element, which includes information regarding where order should be emphasized. For example, in a recipe:
Mix dry ingredients thoroughly
Pour in wet ingredients
Mix for 10 minutes
Bake for one hour at 300 degrees A definition list may be created using the definition list (DL) element, which generally consists of a series of term or definition pairs. An example of a list written in HTML is shown below.

```
<DL>
<DT><STRONG>Lower cost</STRONG>
<DD>The new version of this product costs significantly less than the previous one!
<DT><STRONG>Easier to use</STRONG>
<DD>We've changed the product so that it's much easier to use!
<DT><STRONG>Safe for kids</STRONG>
<DD>You can leave your kids alone in a room with this product and
``` they won't get hurt (not a guarantee).
</DL>

Note that lists may also be nested and different list types may be used together. For example, a definition list may include an unordered list and an ordered list.

Figure 10:
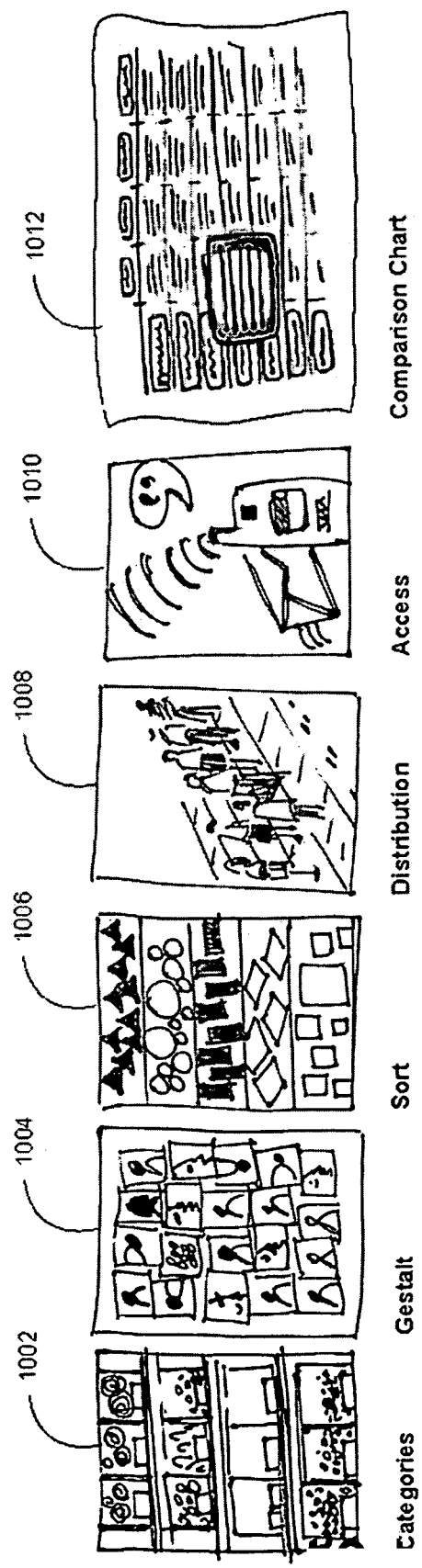
FIG. 10 illustrates exemplary presentations of grids according to embodiments of the present invention.

FIG. 10 illustrates exemplary presentations of grids according to embodiments of the present invention. In this example, a grid may be presented from the perspectives of categories 1002, gestalt 1004, sort 1006, distribution 1008, access 1010, and comparison chart 1012. A grid view aligns attributes or objects into discrete ordering, which in turn enables easy comparison or access of the items in the grid. The categories view 1002 shows buckets of characterizations for easy identification. The gestalt view 1004 shows an overview of an item that allows users to see the whole picture. The sort view 1006 shows items based on their different attributes for easy comparison. The distribution view 1008 shows different objects from the perspectives of time, space, or distance. The access view 1010 provides a means of easy access to information in that particular location of the grid. In one example, a list view containing names of students in the fifth grade class and their corresponding heights in inches may be presented with a grid view showing the height distribution of all the students in the fifth grade class. This presentation of both the list view and grid view makes it easier to identify where in the distribution a particular student belongs to.

In one embodiment, a grid view may be generated through the HTML table model that enables a user to arrange data, such as text, preformatted text, images, links, forms, form fields, other tables, etc., into rows and columns of cells. Each table may have an associated caption that provides a short description of the table's purpose. A longer description may also be provided, via the summary attribute, for users using speech or Braille-based user agents. Table rows may be grouped into the head, foot, and body sections, via the table head (THEAD), table foot (TFOOT), and table body (TBODY) elements, respectively. Row groups convey additional structural information and may be rendered by user agents in ways that emphasize the structure. User agents may exploit the head/body/foot division to support scrolling of body sections independently of the head and foot sections. When long tables are printed, the head and foot information may be repeated on each page that contains table data.

Users may also group columns to provide additional structural information that may be exploited by user agents. Furthermore, users may declare column properties at the start of a table definition, via the column group (COLGROUP) and the column (COL) elements, in a way that enables user agents to render the table incrementally rather than having to wait for all the table data to arrive before rendering.

Table cells may contain either header information or data. Cells may span multiple rows and columns. The HTML table model enables users to label each cell so that non-visual user agents may communicate heading information about the cell to the user more easily. Not only can these mechanisms assist users with visual disabilities, they also make it possible for multi-modal wireless browsers with limited display capabilities, such as web-enabled pagers and phones, to handle tables.

Figure 11:
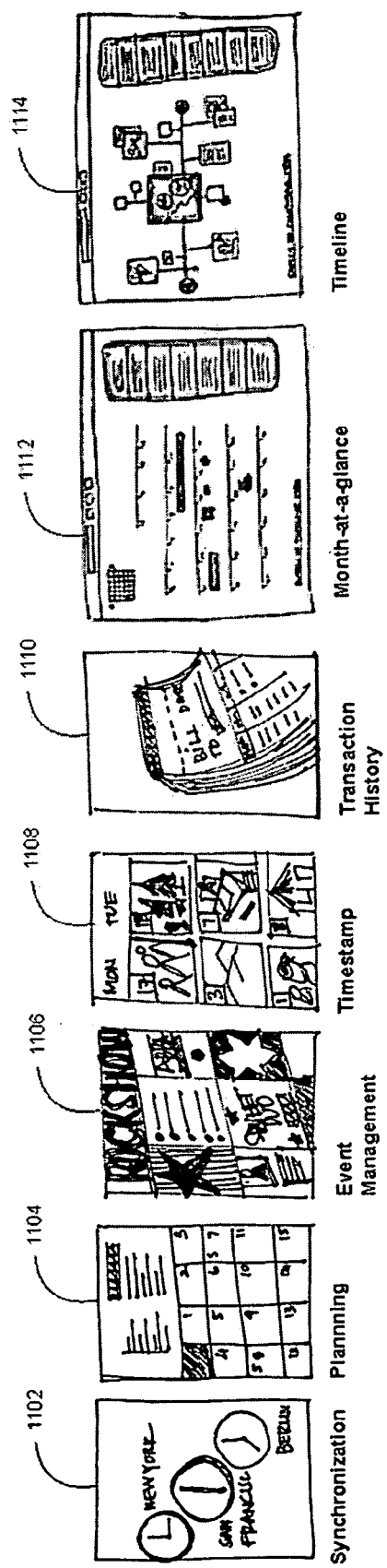
FIG. 11 illustrates exemplary presentations of calendars according to embodiments of the present invention.

FIG. 11 illustrates exemplary presentations of calendars according to embodiments of the present invention. As shown in FIG. 11, a calendar may be presented from the perspectives of synchronization 1102, planning 1104, event management 1106, timestamp 1108, transaction history 1110, month-at-a-glance 1112, and timeline 1114. The synchronization view 1102 allows people to synchronize their watches or to have a meeting by recognizing their time-zone difference. The planning view 1104 gives users a sense of what is happening over time such that they can plan ahead. The event management view 1106 shows when things are happening, whether on a personal business or social level. The timestamp view 1108 allows users to sort their photo collections based on the time stamps on the photographs. The transaction history view 1110 shows users the course of transactional events from the calendar perspective. In one example, a list view of a user's Christmas list containing names and their corresponding gift items may be presented with a calendar view showing the dates purchases were made. This presentation of both the list view and calendar view makes it easier to correlate the items and the dates of the purchases.

In one embodiment, a calendar view is generated through a Calendar Control in the Yahoo! UI Library. The Calendar Control is a UI component that enables a user to choose one or more dates from a graphical calendar. Calendars are generated entirely via script and can be navigated without any page refreshes. The Calendar Control is a useful and easy-to-implement enhancement to any date-selection interaction. The Calendar's foundation classes allow extensions to build complex interfaces that visually organize date-tagged information such as appointments, photos, events, etc.

Figure 12:
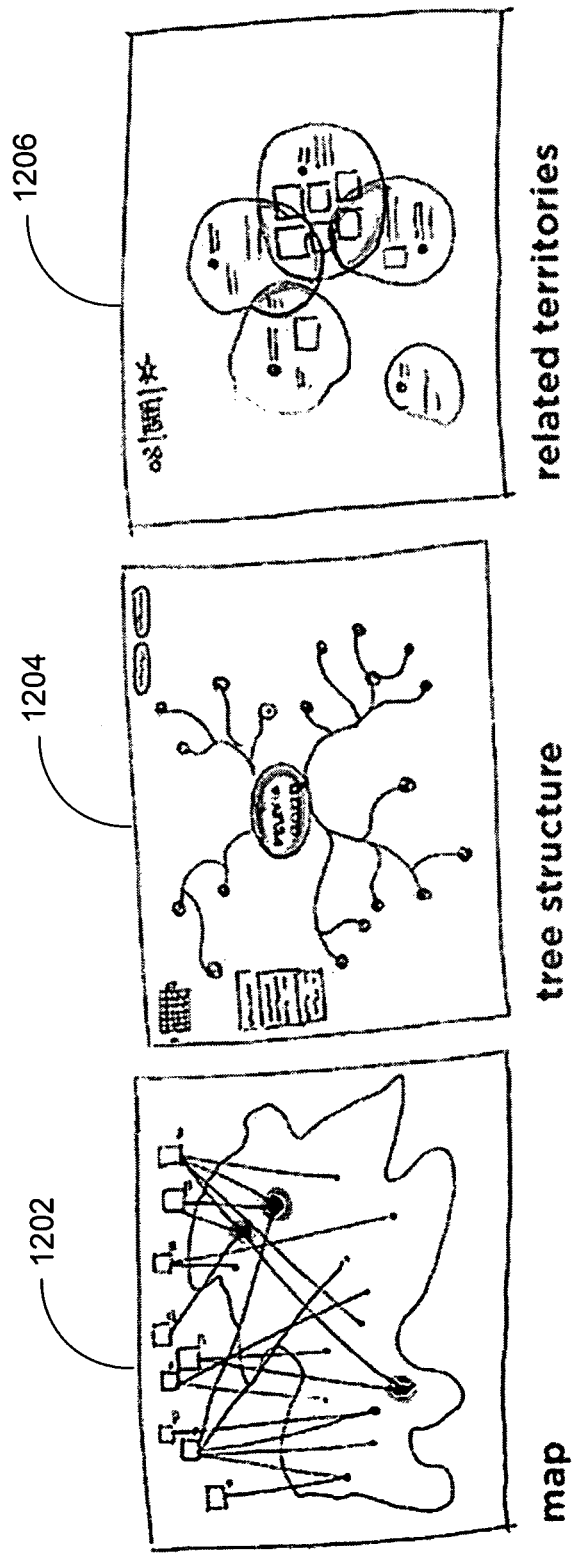
FIG. 12 illustrates exemplary presentations of relationships according to embodiments of the present invention.

FIG. 12 illustrates exemplary presentations of relationships according to embodiments of the present invention. In the example shown in FIG. 12, a relationship may be presented from the perspectives of a map 1202, tree structure 1204, and related territories 1206. In addition, a relationship may be expressed in other forms, such as implicit, friend-of-a-friend, union, likeness, and trust.

The different relationship views show users how things are related to each other. In the map view 1202 of a relationship, it shows all the people in an area who are related to the topic of dyslexia. In the tree structure view 1204 of a relationship, it shows the branches of the tree structure that people belong to. For example, the upper left hand side represents parents who had children with dyslexia; the upper right hand side represents children that have dyslexia; the lower right hand side represents educators; and the lower left hand side represents researchers. This tree structure view 1204 of a relationship is very different from the map view 1202 of the relationship. The related territories view 1206 shows different ways of viewing how some of the relationships overlap each other. Using the related territories view 1206, one can identify the intersections of the relationships. For example, one can identify the researchers who have children that are dyslexic, or educators who have experience in dyslexia research.

Figures 13A, 13B:
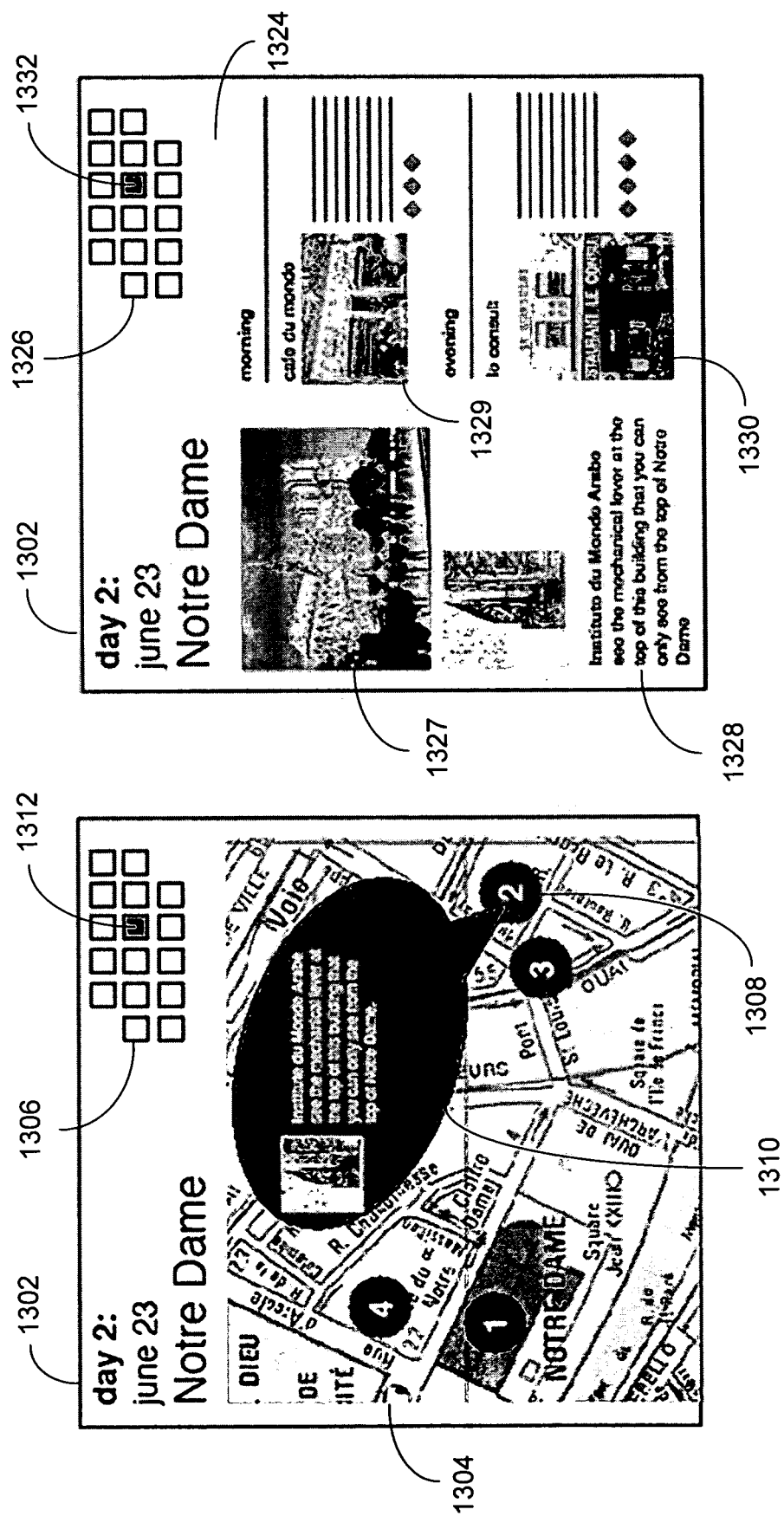
FIG. 13A illustrates representing information in a map view and a calendar view according to an embodiment of the present invention.
FIG. 13B illustrates representing information in a list view and a calendar view according to an embodiment of the present invention.

FIG. 13A illustrates representing information in a map view and a calendar view according to an embodiment of the present invention. As shown in FIG. 13A, a map view 1304 and a calendar view 1306 are displayed on a user device 1302 simultaneously. In the map view, four points of interests are shown, namely points 1, 2, 3, and 4. Additional information about each of the points of interest may be displayed by selecting a particular point. For instance, when point 2 (1308) is selected, a bubble 1310 containing a thumbnail image and a brief description of this point is displayed to allow the user to learn more about this point. In the calendar view, the particular date 1312 of the calendar is highlighted. The user device 1302 further displays the day (day 2) of the trip, the date (June 23), and a title for that day (Notre Dame).

FIG. 13B illustrates representing information in a list view and a calendar view according to an embodiment of the present invention. In this example, a list view 1324 and a calendar view 1326 are displayed on the user device 1302 simultaneously. In the list view, four points of interest 1327, 1328, 1329, and 1330 are shown. Within each list item, a thumbnail image and a short description may be used to learn more about that list item. In the calendar view 1326, the particular date 1332 of the calendar is highlighted. Similarly, the user device 1302 also displays the day (day 2) of the trip, the date (June 23), and a title for that day (Notre Dame).

As shown in FIGS. 13A and 13B, the same set of data objects is displayed in two different presentations. The user can select the first presentation consisting of the map view and the calendar view over the second presentation consisting of the list view and the calendar view. In addition, the user may specify to have temporal information be displayed on the calendar, geo-spatial information be displayed on the map, and information related to a linear process be displayed as a list. Since the presentations are related to each other through the metadata of the data objects, they can be switched from one to the other seamlessly and automatically in accordance with the user's preference.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The invention can be implemented in any suitable form, including hardware, software, firmware, or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as are suited to the particular use contemplated.

What is claimed is:

1. A method comprising:
    collecting, by a computing device, a plurality of data objects on the Internet;
    annotating, by the computing device, each data object in the plurality of data objects in accordance with user-defined data and implicit data, wherein the user-defined data and implicit data form metadata associated with the plurality of data objects;

creating, by the computing device, correlations between the plurality of data objects using the metadata associated with the plurality of data objects;

displaying, by the computing device, a first view representative of the plurality of data objects on the computing device according to the correlations between the plurality of data objects; and displaying, by the computing device, a second view representative of the plurality of data objects on the computing device according to the correlations between the plurality of data objects, wherein the first view and the second view are different, and wherein the first view and the second view are displayed on the computing device simultaneously, wherein a combination of the first view and the second view comprises at least two visual representations selected from the group consisting of a calendar view, a map view, a grid view, and a list view.

2. The method of claim 1, wherein creating correlations between the plurality of data objects comprises:
creating implicit relations between the plurality of data objects.

3. The method of claim 1, wherein creating correlations between the plurality of data objects further comprises:
creating explicit relations between the plurality of data objects.

4. The method of claim 1, wherein the calendar view comprises at least one item selected from the group consisting of a synchronization view, a planning view, an event management view, a timestamp view, and a transaction history view.

5. The method of claim 1, wherein the map view comprises at least one item selected from the group consisting of points of interests, orientations of the map, projection of the map, itinerary of events, and chronological occurrence of events.

6. The method of claim 1, wherein the grid view comprises at least one item selected from the group consisting of a comparison view, a gestalt view, a sort view, a distribution view, and an access view.

7. The method of claim 1, wherein the list view comprises at least one item selected from the group consisting of an agenda view, an itinerary view, a process view, an inventory view, and a list of results view.

8. The method of claim 1, wherein the displaying of the first view and the displaying of the second view is in accordance with user-defined priority preferences.

9. The method of claim 1, wherein the displaying of the first view and the displaying of the second view is in accordance with computer-generated priority preferences.

10. A non-transitory computer-readable storage medium tangibly storing computer program instructions capable of being executed by a computer processor on a computing device, the computer program instructions defining the steps of:

collecting a plurality of data objects on the Internet;

annotating each data object in the plurality of data objects in accordance with user-defined data and implicit data, wherein the user-defined data and implicit data form metadata associated with the plurality of data objects;

creating correlations between the plurality of data objects using the metadata associated with the plurality of data objects;

causing a display of a first view representative of the plurality of data objects on the computing device according to the correlations between the plurality of data objects; and causing a display of a second view representative of the plurality of data objects on the computing device according to the correlations between the plurality of data objects, wherein the first view and the second view are different, and wherein the first view and the second view are displayed on the computing device simultaneously, wherein a combination of the first view and the second view comprises at least two visual representations selected from the group consisting of a calendar view, a map view, a grid view, and a list view.

11. The non-transitory computer-readable storage medium of claim 10, wherein the instructions for creating correlations between the plurality of data objects comprises instructions for:
creating implicit relations between the plurality of data objects.

12. The non-transitory computer-readable storage medium of claim 10, wherein the instructions for creating correlations between the plurality of data objects further comprises instructions for:
creating explicit relations between the plurality of data objects.

13. The non-transitory computer-readable storage medium of claim 10, wherein the calendar view comprises at least one item selected from the group consisting of a synchronization view, a planning view, an event management view, a timestamp view, and a transaction history view.

14. The non-transitory computer-readable storage medium of claim 10, wherein the map view comprises at least one item selected from the group consisting of points of interests, orientations of the map, projection of the map, itinerary of events, and chronological occurrence of events.

15. The non-transitory computer-readable storage medium of claim 10, wherein the grid view comprises at least one item selected from the group consisting of a comparison view, a gestalt view, a sort view, a distribution view, and an access view.

16. The non-transitory computer-readable storage medium of claim 10, wherein the list view comprises at least one item selected from the group consisting of an agenda view, an itinerary view, a process view, an inventory view, and a list of results view.

17. The non-transitory computer-readable storage medium of claim 10, wherein causing the display of the first view and causing the display of the second view is in accordance with user-defined priority preferences.

18. The non-transitory computer-readable storage medium of claim 10, wherein causing the display of the first view and causing the display of the second view is in accordance with computer-generated priority preferences.

19. A method comprising:

obtaining, by a computing device, a plurality of data objects on the Internet, each data object in the plurality annotated in accordance with user-defined data and implicit data, wherein the user-defined data and implicit data form metadata associated with the plurality of data objects;

identifying, by the computing device, correlations between the plurality of data objects using the metadata associated with the plurality of data objects;

causing a display of a first view representative of the plurality of data objects on the computing device according to the correlations between the plurality of data objects; and causing a display of a second view representative of the plurality of data objects on the computing device according to the correlations between the plurality of data objects, wherein the first view and the second view are different, and wherein the first view and the second view are displayed on the computing device simultaneously, wherein a combination of the first view and the second view comprises at least two visual representations selected from the group consisting of a calendar view, a map view, a grid view, and a list view.

\* \* \* \* \*